O. WHITE.
CHANGE-BOX.
No. 190,942.　　　　　　　Patented May 15, 1877.
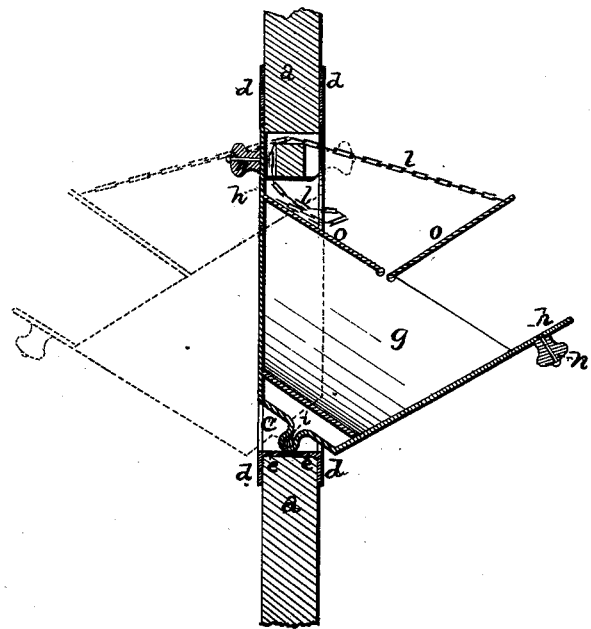
WITNESSES　　　　　　　INVENTOR

UNITED STATES PATENT OFFICE.

ORPHEUS WHITE, OF DETROIT, MICH., ASSIGNOR OF ONE-HALF HIS RIGHT TO ALFRED LOVETT AND ALBERT H. FIELDMAN, OF SAME PLACE.

IMPROVEMENT IN CHANGE-BOXES.

Specification forming part of Letters Patent No. 190,942, dated May 15, 1877; application filed April 23, 1877.

*To all whom it may concern:*

Be it known that I, ORPHEUS WHITE, of Detroit, in the county of Wayne and State of Michigan, have invented certain new and useful Improvements in Change-Box; and I do hereby declare the following to be a full, clear, and exact description of the invention, such as will enable others skilled in the art to which it pertains to make and use it, reference being had to the accompanying drawings, which form part of this specification.

My invention relates to an improvement in change-boxes; and it consists in a triangular-shaped box, that is pivoted at its lower end in an opening through the car-door, and which is provided, at its upper corners, with flanges that serve to snugly close the opening. The box is also provided with lids that are attached to chains or cords, so that as the box is pushed through the door in either direction the chain raises the lid, so as to display the money in the box, all of which will be more fully described hereinafter.

The accompanying drawings represent my invention.

*a* represents an ordinary car-door, which has an opening, *c*, through it, at any suitable distance from the floor, and around this opening, on each side of the door, is placed a plate, *d*, of any ornamental shape or finish. Projecting inwardly from these plates, at the lower edge of the opening, are the flanges *e*, which serve both to hide the opening through the wood, and to make a tight joint to keep out wind, dust, and snow. The box *g* is of a triangular shape, and is pivoted in the center of the opening upon the screw-rod *i*, so as to work freely back and forth through the door. If so desired, the journals for this box may be made upon the corners of the box, and form a part thereof. Upon the upper ends of this box are formed the flanges *h*, which serve as stops to limit the motion of the box, to fit snugly inside of the plate *e*, and thus give a neat finished appearance, and to close up the opening, so that no draft of air, dust, rain, or snow can blow into the car. Upon the top of the box are the two lids *o*, each of which has a short chain fastened to it and to the side of the door. These chains *l* are just long enough to pull one lid open before the box reaches the end of its movement, and hold it raised high enough to show the money in the box and to allow the fingers to be inserted to draw it out.

The box is provided with a knob, *n*, on each side of the door, for convenience of operating it; and, if desired, any suitable striking mechanism may be placed on the driver's side to attract his attention when the change is passed through. The bottom of the box is made concave, so that the change will be readily drawn out at a single movement of the hand.

Having thus described my invention, I claim—

1. The box *g*, provided with the lids *o* and the chains *l*, substantially as specified.

2. The combination of the door *a*, having an opening, *c*, through it, plate *d*, flange *e*, box *g*, lids *o*, and chains *l*, substantially as shown and described.

In testimony that I claim the foregoing I have hereunto set my hand this 12th day of April, 1877.

ORPHEUS WHITE.

Witnesses:
JAS. IRWIN,
FRED. GUENTHER.